(12) United States Patent
Vallespi

(10) Patent No.: US 11,100,681 B2
(45) Date of Patent: Aug. 24, 2021

(54) APPLYING PALETTE-BASED COLOR COMPOSITION TO AN ELECTRONIC IMAGE

(71) Applicant: Adobe Inc., San Jose, CA (US)

(72) Inventor: Jose Ignacio Echevarria Vallespi, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/197,633

(22) Filed: Nov. 21, 2018

(65) Prior Publication Data

US 2020/0160567 A1 May 21, 2020

(51) Int. Cl.
*G06T 11/00* (2006.01)
(52) U.S. Cl.
CPC ........ *G06T 11/001* (2013.01); *G06T 2200/24* (2013.01)
(58) Field of Classification Search
None
See application file for complete search history.

(56) References Cited

PUBLICATIONS

Rhyne, Theresa-Marie. "Applying color theory to digital media and visualization." ACM SIGGRAPH Education Committee, Jan. 9, 2013; https://media.siggraph.org//education/cgsource/color/TM_Rhyne_Color_Theory_Class_SIGGRAPH_Education_Committee2.pdf (Year: 2013).*

Zhen Tang, Zhenjiang Miao, and Yanli Wan. 2010. "Image composition with color harmonization" In 25th International Conference of Image (Year: 2010).*
Li, X., Zhao, H., Nie, G. et al. "Image recoloring using geodesic distance based color harmonization." Comp. Visual Media 1, 143-155 (2015). https://doi.org/10.1007/s41095-015-0013-5 (Year: 2015).*
Youtube, "Color Theory Photography Guide—Photo Editing & Shooting Tips", https://www.youtube.com/watch?v=-IMOOwR0kLo, Jan. 9, 2017, accessed Jul. 18, 2019, 70 pages.
Chang, Huiwen, et al. "Palette-based Photo Recoloring", Siggraph, 2015, 11 pages.
Tan, Jianchao, et al., "Decomposing Images into Layers via RGB-space Geometry", ACM Transactions on Graphics, vol. 36, Issue 4, Jul. 2017, 14 pages.

(Continued)

*Primary Examiner* — Sarah Le
(74) *Attorney, Agent, or Firm* — Kilpatrick Townsend & Stockton LLP

(57) ABSTRACT

In some embodiments, a computing system computes a palette-based color harmony and applies palette-based image recoloration by determining a color palette for the electronic image that includes a first image color at a first position on a color space and a second image color at a second position on a color space. The computing system applies a harmonic template using a combination of a global rotation angle and a secondary rotation angle, such that, the harmonic template, as applied, minimizes an aggregate of hue distances. The computing system modifies the color palette by moving at least one of (i) the first image color from the first position toward a position along a first axis of the harmonic template or (ii) the second image color from the second position toward a modified position along a second axis of the harmonic template. The computing system updates an editing interface.

20 Claims, 11 Drawing Sheets
(6 of 11 Drawing Sheet(s) Filed in Color)

(56) References Cited

PUBLICATIONS

Mellado, Nicolas, et al. "Constrained Palette-Space Exploration", ACM Transactions on Graphics, vol. 36, Issue 4, Jul. 2017, 14 pages.
Color Mavens Advise on Digital Media Creation and Tools, YouTube, ACMSIGGRAPH, Available Online at: https://www.youtube.com/watch?v=XxU3rdEAgTo, Aug. 12, 2018, 3 pages.
Cohen-Or et al., Color Harmonization, Available Online at: https://dl.acm.org/doi/pdf/10.1145/1179352.1141933, ACM SIGGRAPH 2006 Papers, 2006, pp. 624-630.
Tan et al., Palette-Based Image Decomposition, Harmonization, and Color Transfer, Available Online at: https://arxiv.org/pdf/1804.01225.pdf, vol. 1, No. 1, Jun. 20, 2018, pp. 1-17.

\* cited by examiner ical field

This disclosure relates generally to creating or manipulating of artificial images or other graphic objects. Specifically, the present disclosure involves applying palette-based color composition to an electronic image.

BACKGROUND

Color composition of electronic images involves modifying the component colors in an image to enhance the visual appeal of the image. For instance, software applications can analyze the colors and contents of an electronic image and automatically modify (or suggest modifications to) the colors within the content of a given image.

A common method of analysis for the colors of an electronic image is extracting a subset of colors from the electronic image to a color palette. The subset of colors has relationships that can be represented in a color space by angular or linear distances. For instance, color harmony is a predefined set of relationships between a subset of colors that are established based on the aesthetic quality of the image based on the way the human eye perceives color and contrast. In a basic example, ideal complementary colors are two colors that are directly opposite in the color space, such as red and green, or blue and yellow. Certain color relationships that improve aesthetic quality have been established to standardize the predefined color harmonies. The specific relationships have been standardized into relationship templates (i.e., complementary colors, triad, and monochrome) that provide a set of predefined relationship for use in color composition.

Current approaches for color composition, while providing palette extraction and palette editing features, rely heavily on manual, subjective adjustments by end users. For instance, a graphics editor may detect that an electronic image includes a color palette with three colors. But such graphics editor only allow a user to manually adjust specific color values in the palette, rather than applying any systematic approach to modifying multiple colors in the palette. Achieving a desirable adjustment to the color palette of an image therefore requires extensive trial-and-error on the part of a user, and the resulting adjustments may still achieve a sub-optimal color composition.

Therefore, existing techniques include disadvantages such as, but not limited to, those described above.

SUMMARY

Certain embodiments involve applying a palette-based color harmony and palette-based image recoloration to an electronic image. For instance, an electronic image processing application determines a color palette for the electronic image that includes a first image color at a first position on a color space and a second image color at a second position on a color space. The electronic image processing application applies a harmonic template using a combination of a global rotation angle and a secondary rotation angle, such that, the harmonic template, as applied, minimizes an aggregate of hue distances. The electronic image processing application modifies the color palette by moving at least one of (i) the first image color from the first position toward a position along a first axis of the harmonic template or (ii) the second image color from the second position toward a modified position along a second axis of the harmonic template. The electronic image processing application updates an editing interface to display the modified color palette.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

Figure 1:
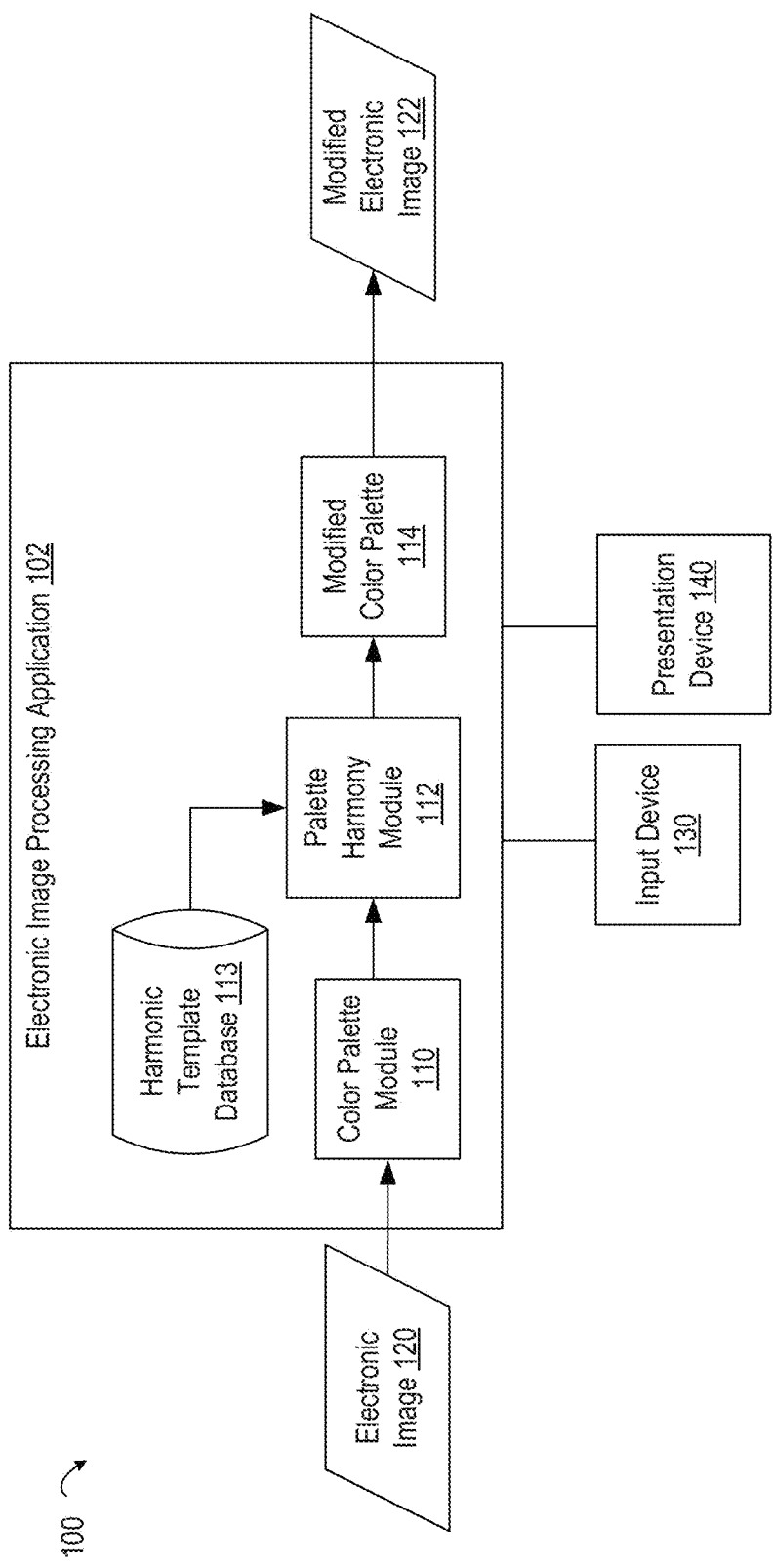
FIG. 1 depicts an example of a computing environment in which an electronic image processing application applies palette-based color composition to an electronic image, according to certain embodiments of the present disclosure.

The patent or application file contains at least one drawing executed in color. Copies of this patent or patent application publication with color drawing(s) will be provided by the Office upon request and payment of the necessary fee.

DETAILED DESCRIPTION

Certain embodiments involve applying palette-based color composition to an electronic image by performing color composition on a color palette containing multiple colors from the electronic image. These embodiments can perform color composition on a color palette using the relationship between the color palette and a selected color harmony template. For instance, the color composition can involve modifying the color palette to more closely align relationships among the palette colors to relationships between axes of a suitable color harmony template, thereby improving the aesthetic quality of the electronic image while avoiding the inconsistent manual manipulation of individual colors.

The following non-limiting example is provided to introduce certain embodiments. In this example, an electronic image processing application applies palette-based color composition to an electronic image. The palette-based color composition involves determining a color palette that includes a first image color at a first position on a color space and a second image color at a second position on a color space, such as a cylindrical color space (e.g., HSV, HSL, LCh, etc.). A position of an image color on the color space is defined by coordinates that indicate the location of the image color on a color space (e.g., an HSV color wheel, LCh, etc.). A first image color could be the color having the highest quantity of pixels in the electronic image, or computed visual weight. A second image color could be the color having the second-highest quantity of pixels in the electronic image or computed visual weight. The electronic image processing application optimizes the relationships between the first and second image colors by applying a harmonic template in the color space. A harmonic template is a predefined set of angular relationships (e.g., a relationship such as "triad" with three axes split by 120°). The harmonic template predefines a relationship between multiple colors that provide a desired aesthetic based on the perception of a human eye.

Continuing with this example, the electronic image processing application applies the harmonic template by aligning one or more axes with the image palette colors, according to a combination of a global rotation angle and a secondary rotation angle, which minimize an aggregate of hue distances computed from the various image palette colors at the various locations in the color space. A global rotation angle is the angle applied from a reference point to the location of a primary axis of the harmonic template that minimizes a summation of the angular distances between the image palette colors and the closest axis of the harmonic template. A secondary rotation angle is the angle applied to secondary or additional axes of the harmonic template that further reduces the angular distance between the image palette colors and the axes of the harmonic templates (e.g., some secondary axes can move up to 30° in both directions, from the initial position set by the global rotation angle). The electronic image processing application associates the image palette colors with an axis of the harmonic template that is the closest after application of the global rotation angle and secondary rotation angle.

Continuing with this example, the electronic image processing application performs palette-based color composition by moving the image palette colors from their respective positions towards the closest axes of the harmonic template. For instance, the electronic image processing application moves the first image color to a modified first position by applying a transformation such that the first axis of the harmonic template passes through the modified first position. The electronic image processing application moves the second image color to a modified second position by applying a transformation such that the second axis of the harmonic template passes through the modified second position. Moving each color involves modifying the color space coordinates so that a distance, in the color space, between the image color and the harmonic template axis is decreased (e.g., making an image color more "blue" by increasing the hue coordinate in a set of HSV coordinates). The electronic image processing application updates the color palette with the modified first and second image colors at their modified second positions. The electronic image processing application displays the updated color palette in an editing interface presented to a user of the electronic image processing application.

As used herein, the term "electronic image" is used to refer to an electronic image having color or object information (i.e., a .JPEG, a .PNG, .GIF, a vector image, a raster image). The electronic image can be local to a device, or a web-based platform, such as a webpage. In some embodiments, a color can be an RGB color converted into an HSV color, or a component color in another cylindrical color space. For instance, a color can be used to represent visually aesthetic elements of an electronic image such that the colors of the image can present contrasting visual elements.

As used herein, the term "electronic image processing application" is used to refer to a software application being executed on an electronic server, or group of servers that perform operations on electronic documents as described herein.

As used herein, the term "harmonic template" is used to refer to a predefined set of distance relationships between multiple colors that provide optimized contrast and aesthetically appealing perceptive elements.

Referring now to the drawings, FIG. 1 depicts an example of a computing environment in which an electronic image processing application applies palette-based color composition to an electronic image, according to certain embodiments of the present disclosure. In various embodiments, the computing environment 100 includes an electronic image processing application 102. The electronic image processing application 102 is a software application for processing electronic image 120.

The electronic image processing application 102 receives an electronic image 120. One example of the electronic image 120 is a raster image, though other electronic image formats can be used. Electronic image processing application 102 processes the electronic image by applying a color palette module 110 to electronic image 120. An example of the color palette module 110 is a software engine that determines a color palette for the electronic image. A color palette is a set of colors contained in the electronic image 120 that exist in a color space, such as a HSV (Hue, Saturation, Value) color space.

The color palette module 110 identifies a first image color at a first position on the color space. An example of a first image color is a key color of electronic image 120, for example, such as a "blue" hue at (205, 95, 70) on the HSV color space. The color palette module 110 determines the first image color by identifying the maximum value of color in a color histogram that indicates the number of pixels that correspond to each color in the electronic image 120. A color histogram is a representation of the distribution of colors in the electronic image 120. The color palette module 110 represents the first color at a position in a color space. For instance, values at a location ($H_1$, $S_1$, $V_1$) represent a hue angle ranging from [0°, 360°] measured from the red primary, a saturation as a real number ranging from [0, 1], and value of lightness (or brightness) as a real number ranging from [0,1] of the first color at that location. The color palette module 110 identifies a second color at a second position on the color space using the second maximum of the color histogram. The color palette module 110 represents the second color at a position in a color space with values ($H_2$, $S_2$, $V_2$) representing the hue angle ranging from [0°, 360°]

measured from the red primary, a saturation as a real number ranging from [0, 1], and value of lightness (or brightness) as a real number ranging from [0,1] of the second color. The color palette module 110 represents the color palette in a color space with the first color at $(H_1, S_1, V_1)$ and the second color at $(H_2, S_2, V_2)$.

The electronic image processing application 102 applies palette harmony module 112 to the output of color palette module 110. The palette harmony module 112 applies a harmonic template to a color space that includes the first color at $(H_1, S_1, V_1)$ and the second color at $(H_2, S_2, V_2)$.

The palette harmony module 112 defines a harmonic template by using a defined set of relationships between colors based on a specific color harmony. The palette harmony module 112 defines the relationship between colors as an angle between a first axis that extends through the center of the color space and the first color, and a second axis that extends through the center of the color space and the second color. An example of a color harmony is a relationship between two or more colors that provides a visually appealing image, such as two colors in a complementary harmony with positions directly opposite in the color space. In a complementary harmony, if the first color is a "red" at a location of (0, 1, 1), the corresponding complementary color is a "blue-green" at a location (180, 1, 1). In another example of a color harmony, a triad color harmony is a relationship between three colors. If a first color of a triad color harmony is a "blue" at location (240, 1, 1), then a second color is a "red" at location (0, 1, 1), and the third color is a "green" at location (120, 1, 1). Further detail of harmonic templates and color harmonies are described herein with respect to the examples of FIGS. 3 and 4.

The palette harmony module 112 determines a harmonic template by selecting from a set of predefined harmonic templates in harmonic template database 113. The harmonic template database 113 contains any number of harmonic templates. For example, the harmonic template database 113 contains monochrome, complementary, single split, triad, double split, square, analogous, T-type, L-type, and N-type harmonic templates. The palette harmony module 112 determines the harmonic template by computing an aggregate hue distance from the selected harmonic template from harmonic template database 113 to the identified colors of the color palette.

In an example, the palette harmony module 112 receives the output of color palette module 110 and computes an aggregate hue distance from each color of the color palette to the closest axis of the harmonic template. The palette harmony module 112 may compute the aggregate hue distance after applying a global rotation angle to the harmonic template. The palette harmony module 112 defines the global rotation angle as the angle measured from a reference, such as from a location, such as the red primary located at (0, 1, 1) on the HSV color space, that minimizes the distance between the first color of the color palette and a first axis of the harmonic template.

In other cases, the palette harmony module 112 computes harmonic template cost by multiplying the measured hue distance and a visual weight. This computation can be represented as $H_{cost}=H_{dist}*W_{visual}$ with $H_{cost}$ approximating of the hue cost of rotating each color into a harmonic position along the closest axis of the harmonic template, $H_{dist}$ represents the Hue distance between the color and the closest axis of the harmonic template, and $W_{visual}$ represents the visual weight of the color within the electronic image 120. The palette harmony module 112 computes this by combining the color, the lightness value and the saturation value. Accordingly, colors closer to the center of the color wheel (smaller Saturation values in (H, S, V)) have a lower cost based on the smaller arc distance than colors that have high values of Saturation that are visualized at the outer edge of the HSV color wheel.

In some embodiments, the palette harmony module 112 applies a secondary rotation angle to a second axis of a harmonic template. The palette harmony module 112 defines the secondary rotation angle as an angular distance (measured in terms of hue angle) between the second axis of the harmonic template and an adjusted position of the second axis. The palette harmony module 112 computes the secondary angle such that the adjusted position of the second axis minimizes the distance between the second color and the second axis. In some embodiments, the secondary rotation angle is limited to approximately 30° in order to maintain the defined relationships of the harmonic template.

The palette harmony module 112 generates modified color palette 114 by applying transformations to each of the colors included in the color palette. In this example, the palette harmony module 112 will apply a transformation to each color of the color palette. The palette harmony module 112 modifies the color palette by translating the first color from the first position towards a position along the first axis of the harmonic template. The palette harmony module 112 further modifies the color palette by translating the second color from the second position towards a position along the second axis of the harmonic template. The palette harmony module 112 stores the new positions of each color as modified color palette 114.

In an alternative embodiment, the palette harmony module 112 generates the modified color palette 114 by receiving a user-selection of colors that are not extracted from the electronic image 120. The palette harmony module 112 is agnostic of palette extraction method. In some cases, the palette harmony module 112 uses the color palette 114 and computed relevance of each color (e.g., number of pixels, mixing weights, etc.), however, other cases using just the color palette 114 and equal relevance values for each color provides similar results.

The electronic image processing application 102 applies the modified color palette 114 to electronic image 120 to generate modified electronic image 122. The electronic image processing application 102 generates modified electronic image by performing a palette-based image recoloring process dependent on the palette extraction method, but agnostic with respect to the palette harmonization step. The electronic image processing application 102 modifies the electronic image 120 by applying a translation to the colors of the electronic image. The electronic image processing application 102 applies a translation that is representative of the relationship between the modified color palette 114 and the output of color palette module 110. The electronic image processing application 102 applies the translation to each color of the electronic image to generate modified electronic image 122. The electronic image processing application 102 outputs the modified electronic image 122. In some embodiments, the electronic image processing application outputs the modified electronic image 122 to a presentation device 140.

Figure 2:
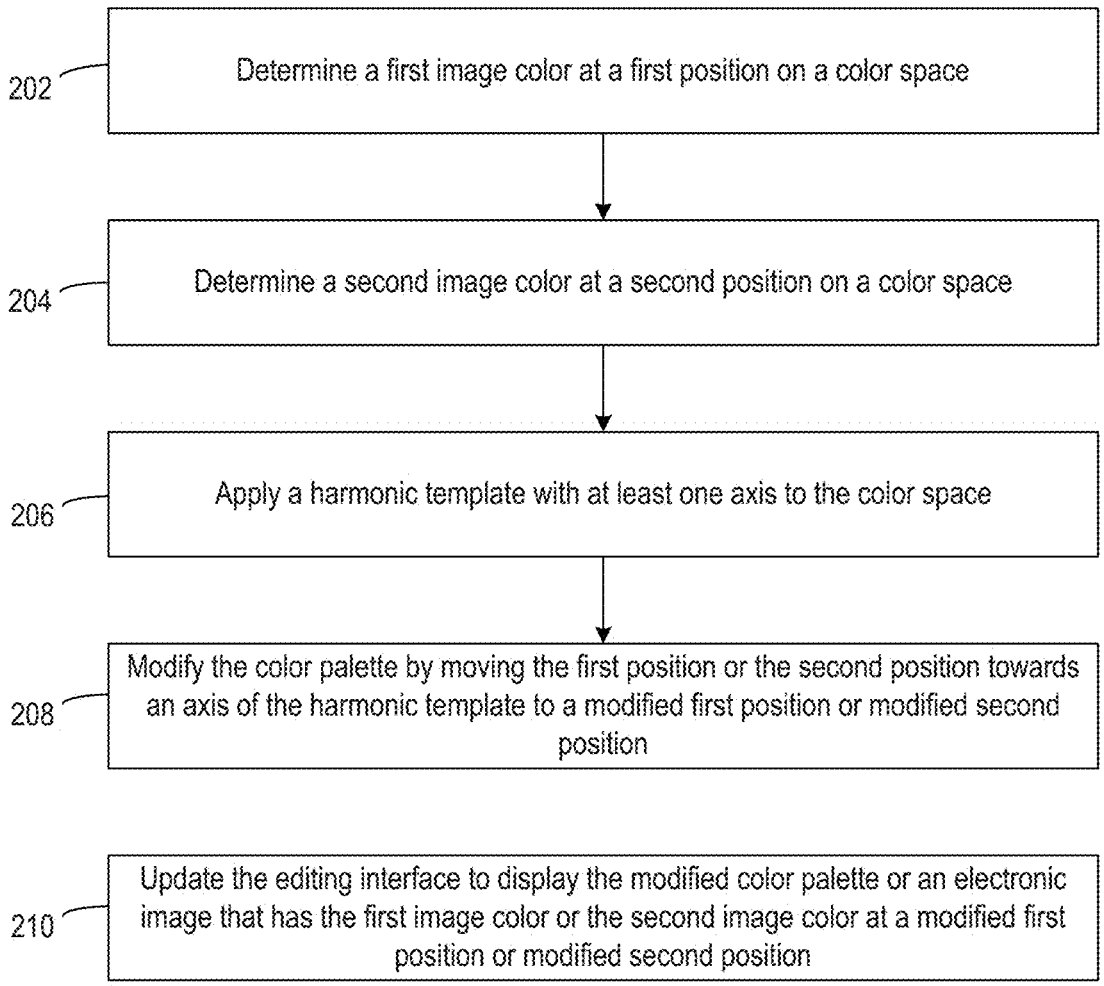
FIG. 2 depicts an example of a process for applying palette-based color composition to an electronic image, according to certain embodiments of the present disclosure.

FIG. 2 depicts an example of a process 200 for applying palette-based color composition to an electronic image, according to certain embodiments of the present disclosure. One or more computing devices or software applications (e.g., the electronic image processing application 102) implement operations depicted by FIG. 2 by executing suitable program code. For illustrative purposes, the process 200 is described with reference to certain examples depicted in the figure. Other implementations, however, are possible.

At block 202, the process 200 involves determining a first image color at a first position on a color space. The color palette module 110 determines the first image color by analyzing the most prolific hue within the electronic image 120 and computing the coordinates on an HSV color wheel. In some embodiments, the color palette module 110 generates a color histogram of electronic image 120 representing the distribution of colors within the electronic image 120. The color palette module 110 determines an overall maximum value of the color histogram and designates the overall maximum value as the first color. The color palette module 110 assigns the first position of the first color by assigning the HSV coordinates of the color with the maximum relevance or visual weight.

Figure 3:
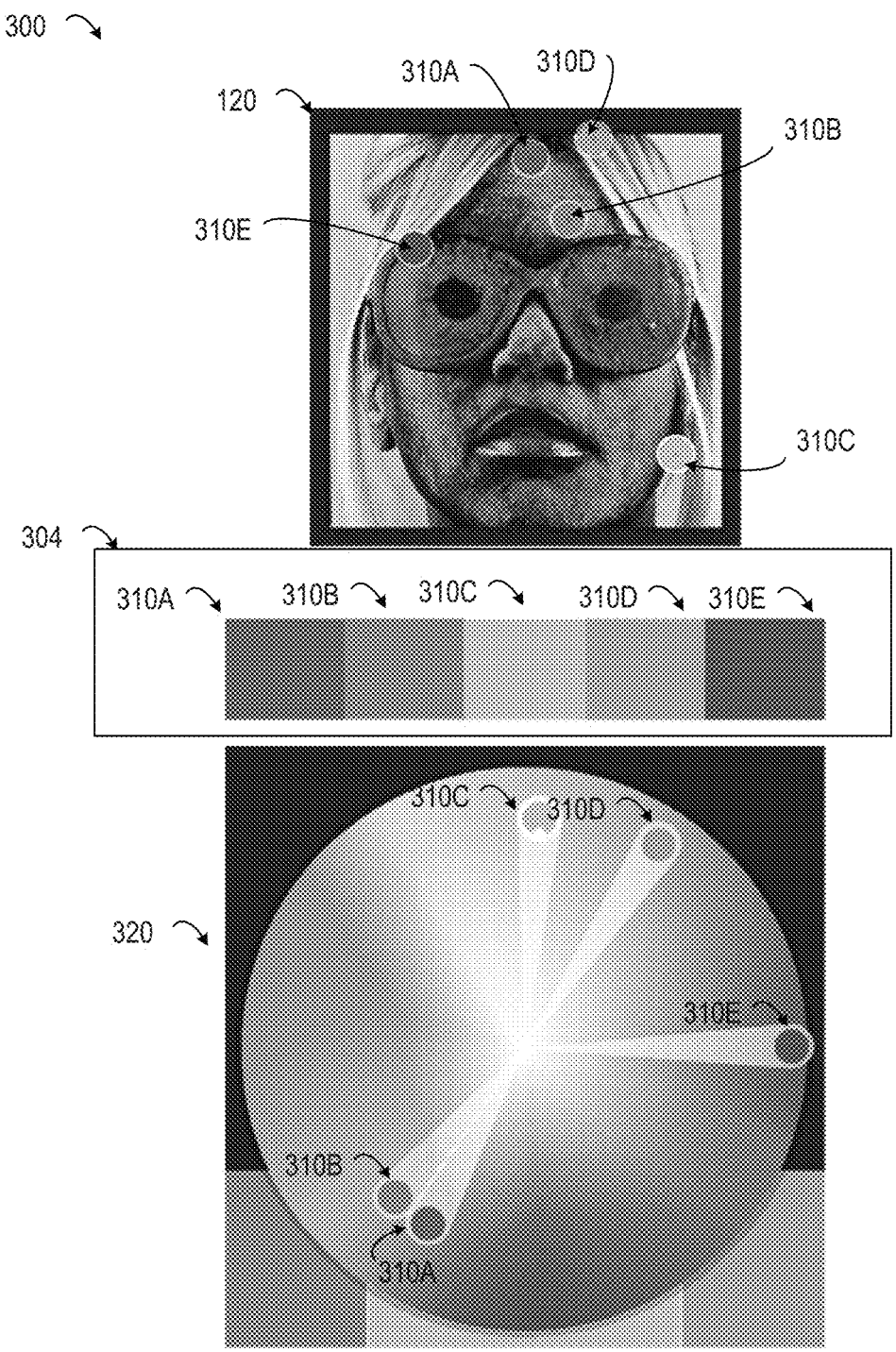
FIG. 3 depicts an example of a color palette for an electronic image, according to certain embodiments of the present disclosure.

For example, FIG. 3 depicts an example of a color palette for an electronic image, according to certain embodiments of the present disclosure. In this example, the electronic image 120 is processed by the color palette module 110. The color palette module 110 extracts multiple colors 310A-E from electronic image 120. The color palette module 110 determines, based on a color histogram maximum or visual weight, that the "first color" is color 310A. The color palette module 110 determines that the first position of the first color is at the HSV coordinates on the color wheel 320. In this example, the color palette module 110 determines the first position coordinates (204, 70, 65) of first color "blue."

Returning to FIG. 2, at block 204, the process 200 involves determining a second image color at a second position on a color space. For instance, the color palette module 110 determines the second image color by analyzing the second most prolific hue within the electronic image 120 and computing the coordinates on a HSV color wheel. In some embodiments, the color palette module 110 determines a second overall maximum value of the color histogram and designates the second overall maximum value or visual weight as the second color. The color palette module 110 assigns the second position of the second color by assigning the HSV coordinates of the color with the second overall maximum relevance or visual weight.

Continuing the previous example from FIG. 3, the color palette module determines that the "second color" is color 310C based on a second maximum of the color histogram for electronic image 120. The color palette module 110 determines that the second position of the second color is at the HSV coordinates on the color wheel 320. In this example, the color palette module 110 determines the second position coordinates (42, 82, 95) of the second color "yellow."

At block 206, the process 200 involves applying a harmonic template with at least one axis to the color space. The palette harmony module 112 selects a harmonic template from harmonic template database 113. The palette harmony module 112 determines the harmonic template to select by comparing each harmonic template in harmonic template database 113 to the relationship between the first color and the second color. The palette harmony module 112 computes for each harmonic template an aggregate hue distance, measured from the closest axis of the harmonic template to the respective first or second color.

Continuing the previous example from FIG. 3, the palette harmony module 112 applies various harmonic templates of harmonic template database 113. In this example, the angular distance between first color 310A and second color 310C is compared to various harmonic templates of harmonic template database 113. In some embodiments, the palette harmony module 112 applies a global rotation angle to multiple axes of the harmonic template. Applying the global rotation angle causes the first axis of the harmonic template to pass through the center of the HSV color space and the first color at the first position. The palette harmony module 112 measures the global rotation angle from a reference position, which in some cases is the primary color "red" at (0, 1, 1). The palette harmony module 112 determines a closest color harmonic template by computing the aggregate hue distance between each color and the closest axis. In this example, the palette harmony module 112 determines that the harmonic template for the first color at the first position and the second color at the second position is a triad harmonic template. Further details regarding the computation of the harmonic template are discussed in relation to FIG. 4.

In additional or alternative embodiments involving the example of FIG. 3, the angular distances between first color 310A, second color 310C, third color 310B, fourth color 310D, and fifth color 310E are compared to various harmonic templates of harmonic template database 113. The palette harmony module 112 applies a global rotation angle to multiple axes of the harmonic template such that the first axis of the harmonic template passes through the center of the HSV color space and minimizes the aggregate hue distance from each of the colors 310A-E to the closest axis of the harmonic template as applied. For example, as illustrated in FIG. 3, the palette harmony module 112 computes the distance between the first color 310A and third color 310B. The palette harmony module 112 determines that the first axis of harmonic template will minimize aggregate hue distance when placed between the first color 310A and the third color 310B.

In some cases, the palette harmony module 112 associates the each of the colors 310A-E to the axis of the harmonic template that is closest to the respective color. In one example, the palette harmony module 112 associates each of color 310A-C with the first axis of the harmonic template, and each of color 310D-E with the second axis of the harmonic template. The palette harmony module 112 associates each of the colors and including indications of the side of the respective axes that each of color 310A-E are positioned to enforce maintenance of a contrast relationship (i.e., warm color "red", cool color "blue").

In another example (i.e., monochrome palette with a triad style color palette), the palette harmony module 112 associates each of color 310A-E with the first axis of the harmonic template, and based on the distribution of colors in the color space, does not associate any of colors 310A-E with the second axis of the harmonic template. In the above example of a triad template, if the palette harmony module 112 identifies an axis of a harmonic template that does not have an associated image color, the palette harmony module 112 determines the harmonic unsuitable for the image and selects a different harmonic template from harmonic template database 113.

Returning to FIG. 2, at block 208, the process 200 involves modifying the color palette by moving the first position or the second position towards an axis of the harmonic template to a modified first position or modified second position. The color palette module 110 extracts multiple colors 310A-E of electronic image 120. The colors 310A-E that represent the most prolific hues in electronic image 120 can be represented on a palette, such as color palette 304. The color palette module 110 can represent any number of colors 310A-E, and as illustrated in FIG. 3, represents five colors of electronic image 120. The color palette can also be represented on a color wheel as shown by colors 310A-E distributed on color wheel 320. As described above with regard to FIG. 3, palette harmony module 112 applies a harmonic template with more than one axis to the color palette. The palette harmony module 112 modifies the color palette 304 by moving at least one color of the color palette 304 towards the closest axis of the harmonic template. In an example, the palette harmony module 112 modifies the first color at the first position to a modified position along the first axis of the harmonic template. The palette harmony module 112 stores the modified first position, the modified second position, etc.

In another example, the palette harmony module 112 stores the hue distance relationship between a color 310 of the color palette 304 and an axis (e.g., first axis, second axis, third axis, etc.) of the harmonic template. The palette harmony module 112 modifies the position of the colors 310A-E based on input received from a user input device that indicates a desired modification of the axis of the harmonic template (e.g., the first axis, the second axis, the third axis, etc.) or a desired modification of a position of a color 310. Further details of the computations relating to harmonic templates are described with regard to FIG. 4

At block 210, the process 200 involves updating the editing interface to display the modified color palette or an electronic image that has the first image color or the second image color at the modified first position or modified second position. The electronic image processing application 102 updates an editing interface, such as the editing interface depicted by FIG. 6 to display a modified color palette 114 or a modified electronic image 122 that has been transformed by the difference between the color palette 304 and the modified color palette 114. For example, the electronic image processing application 102 translates the colors 310A-E of electronic image 120 to modified positions that are translated by the corresponding difference of the modified color palette 114 and color palette 304. A visual example and further explanation are provided with regard to FIG. 6.

Figure 4:
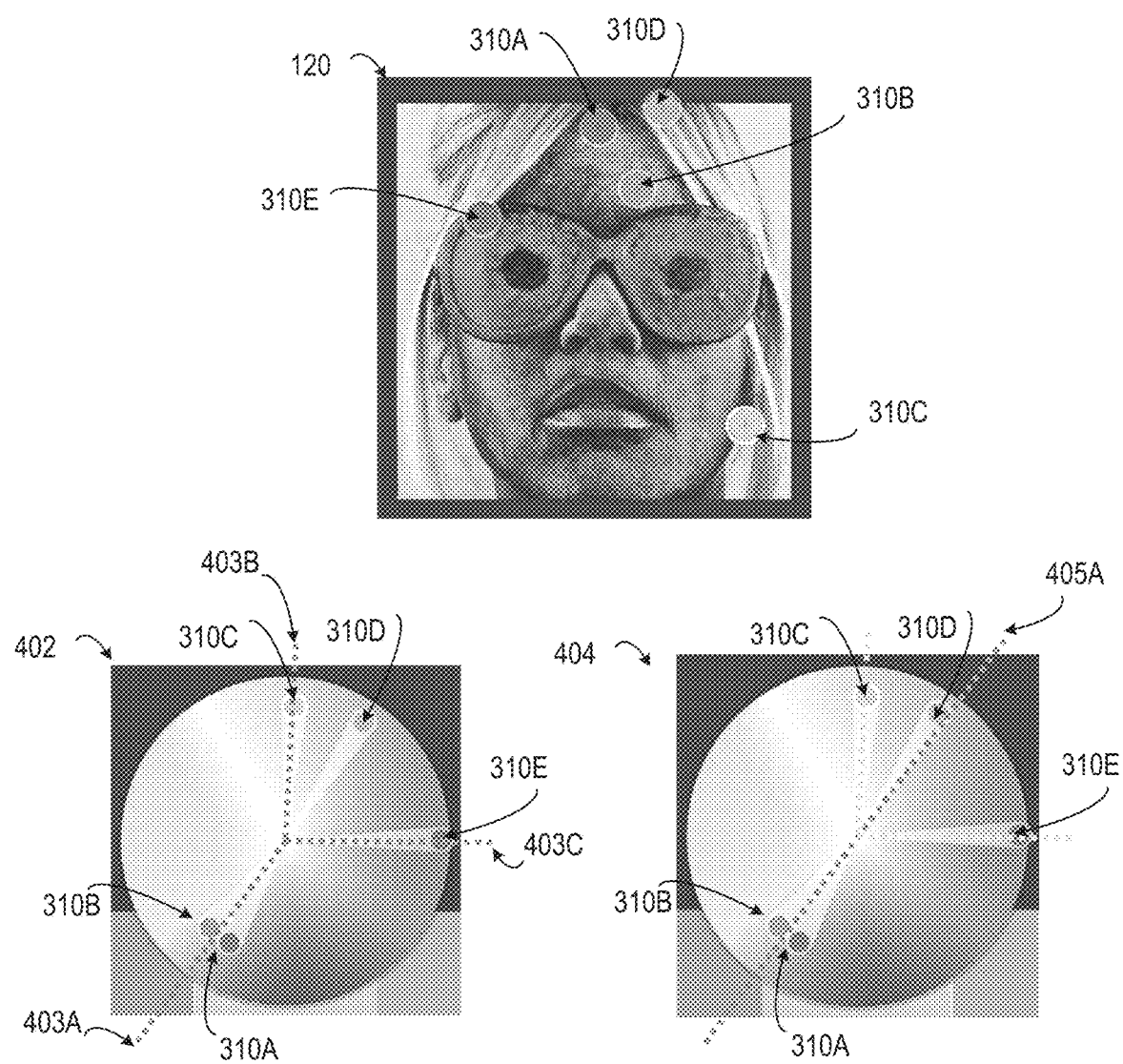
FIG. 4 depicts an example of applying a harmonic template to the color palette of the electronic image, according to certain embodiments of the present disclosure.

FIG. 4 illustrates an example of applying a harmonic template to the color palette of the electronic image, according to certain embodiments of the present disclosure. In this example, the palette harmony module 112 receives the color palette 304 from the color palette module 110. The color palette 304 identifies the first color 310A and the second color 310C. The palette harmony module 112 applies various harmonic templates from harmonic template database 113 to the electronic image 120. The palette harmony module 112 computes the distance between each of the colors 310A-E and the closest axis of each harmonic template. The palette harmony module 112 computes, from the combination of these distances, an aggregate hue distance from the harmonic template to the colors 310A-E. The palette harmony module 112 selects the harmonic template from the harmonic template database 113 that minimizes the aggregate hue distance from the harmonic template to the colors 310A-E.

In one example, the palette harmony module 112 selects a triad harmonic template 402. The palette harmony module 112 computes the distance $D_1$ between the first color 310A and the closest point of the first axis 403A of the triad harmonic template 402 using a formula such as:

$$D_1 = |H_{Axis} - H_{Color}| \qquad (1).$$

In Equation (1), $H_{Axis}$ represents the angular hue position of the axis of the harmonic template as measured from the reference, and $H_{Color}$ represents the angular hue position of the axis of the first color 310A as measured from the reference, where the reference is the primary red color at position (0, 1, 1). Accordingly, $D_2$ is computed between color 310B and axis 403A, $D_3$ is computed between second color 310C and axis 403B, $D_4$ is computed between color 310D and axis 403B, and $D_5$ is computed between color 310E and axis 403C. The palette harmony module 112 computes the aggregate hue distance $D_{Agg}$ by performing a summation of the n distances between the various colors 310A-E and the respective closest axes of the harmonic template 403. An example of a formula for this aggregate distance computation is $D_{Agg} = D_1 + D_2 + \ldots + D_n$. The saturation and value parameters of the colors 310A-E do not impact hue distance and are thus not included in this computation.

In another example, the palette harmony module 112 selects a complementary harmonic template 404. The palette harmony module 112 computes the aggregate hue distance for the harmonic template 404 using Equation (1) and the values of $H_{Axis}$ for the single axis 405A of the complementary harmonic template 404. For instance, $D_1$ is computed between color 310A and axis 405A, $D_2$ is computed between color 310B and axis 405A, $D_3$ is computed between second color 310C and axis 405A, $D_4$ is computed between color 310D and axis 405A, and $D_5$ is computed between color 310E and axis 405A.

In some embodiments, the palette harmony module 112 computes a secondary rotation angle between the second axis (e.g., or additional axes) of the harmonic template and an adjusted position of the second axis. The secondary rotation angle further reduces the aggregate hue distance between a harmonic template and colors 310A-E. In one example, the palette harmony module 112 limits the secondary rotation angle to approximately 30 degrees, which can maintain the defined relationships of the harmonic template.

The palette harmony module 112 can generate a modified color palette 114 by performing a color harmonization on the color palette 304 using the applied harmonic template. The palette harmony module 112 performs color harmonization by modifying the color palette 304 to more closely align with the applied harmonic template.

For example, the palette harmony module 112 modifies the first color 310A from the first position ($H_1$, $S_1$, $V_1$) towards the first axis 403A to a modified first position ($H'_1$, $S'_1$, $V'_1$) along the axis 403A. The palette harmony module moves the first position to a modified first position, where the axis 403A passes through the modified first position. In some embodiments, the palette harmony module 112 moves the first color along an arc such that the modified first position is the same distance from the origin of the HSV color wheel $S_1$ as the first position ($H_1$, $S_1$, $V_1$). The palette harmony module 112 can also move the second color 310C from the second position ($H_2$, $S_2$, $V_2$) towards the second axis 403B to a modified second position ($H'_2$, $S'_2$, $V'_2$) along the axis 403B The palette harmony module moves the second position to a modified second position where the axis 403B passes through the modified second position. The palette harmony module 112 may modify any combination of the colors 310A-E to modified positions. In some instances, the palette harmony module 112 may modify a particular color of colors 310A-E at a position based on input received from a user.

Figure 5:
FIG. 5 depicts an example of modifying colors by applying a palette-based color composition to an electronic image, according to certain embodiments of the present disclosure.

FIG. 5 illustrates an example of modifying colors by applying a palette-based color composition to an electronic image, according to certain embodiments of the present disclosure. In this example, the electronic image processing application 102 applies transformations to the electronic image 120 to generate the modified electronic image 122.

For example, the color palette module 110 determines, from electronic image 120, a color palette 304 with colors 502A, 502B, 502C, 502D, and 502E. The palette harmony module 112 applies a harmonic template to the color palette 304. The palette harmony module 112 modifies, using the applied harmonic template, the positions of various colors to generate modified color palette 114 with colors 506A, 506B, 506C, 506D, and 506E. The palette harmony module 112 provides the modified color palette 114 to the electronic image processing application 102.

In some embodiments, the color palette module 110 extracts the color palette 304 with colors 502A-E from electronic image 120. The electronic image processing application 102 can apply the transformations represented by a function of the color palette 304 and the modified color palette 114. For example, the electronic image processing application transforms pixels of electronic image 120 based on each pixel's color distance to a corresponding color of the color palette. The electronic image processing application may apply transforms to an individual pixel of the electronic image 120 that are proportional to the distance between the first color and second color. In other words, a pixel that is halfway between the first color at the first position and the second color at the second position has a modification that represents 50% of the modification to the first position, and 50% of the modification to the second position. For example, the palette harmony module 112 moves the first color from a first position $(H_1, S_1, V_1)$ with values (90, 1, 0.50) to the modified first position $(H'_1, S'_1, V'_1)$ with values (120, 1, 0.5). The palette harmony module 112 would move the pixels that are halfway between the first color and second color by (+30, 0, 0) to represent half of the movement (+30° of hue) between the first position and the modified first position (e.g., half of the total translation of (+30, 0, 0). The palette harmony module 112 would apply a similar computation to pixel based on the second color movement. The electronic image processing application 102 adjusts each pixel of electronic image 120 to generate a modified electronic image 122. The electronic image processing application 102 outputs the modified electronic image 122, in some cases to a presentation device 140 that presents the modified electronic image 122 as part of a user interface, such as the interface depicted in FIG. 6.

In alternative or additional embodiments, the color palette module 110 can determine the color palette 304 by other means such as receiving a set of selected colors from a user interaction, or an arbitrary set of colors generated by the electronic image processing application 102 can apply the transformations represented by a function of the color palette 304 and the modified color palette 114.

Although the examples above involve an HSV color space, other implementations are possible. In an example using LCh color space, the palette harmony module 112 computes the global rotation angle as a measure of angular distance (e.g., at a constant distance from the origin of the color space) between the color palette 304 and the harmonic template. The palette harmony module 112 computes the cost of the harmonization calculating $D(P, T_m(\alpha)) = \Sigma_{i=1}^{|P|} W(P_i) \cdot L(P_i) \cdot C(P_i) \cdot |H(P_i) - T_m^{j*}(\alpha)|$, where $P_i$ represents a color 310 of the color palette 304. And $$j^* = \operatorname*{argmin}_{j=1\ldots n} |H(P_i) - T_m^j(\alpha)|$$

is the axis closest to each color. The palette harmony module 112 represents j* as the axis of the harmonic template that is closest to each of the colors 310A-E, $H(P_i)$ represents the position of the color $P_i$ from the colors 310A-E, and $T_m^j(\alpha)$ represents j axis of the template $T_m$ (i.e., m indicates the selected template from harmonic template database 113) closest to the palette color at the global rotation angle α. The palette harmony module 112 uses the $W(P_i)$ term to represent the contribution of the color $P_i$ to all of the pixels in electronic image 120. The palette harmony module 112 uses W ($P_i$) to more accurately align the first axis with the first color 310A. The palette harmony module 112 uses the $L(P_i)$ and the $C(P_i)$ terms to represent the lightness and chroma, respectively, of the electronic image 120. The palette harmony module uses chroma to compute the circular sector between a color 310 and the harmonic template 403. A smaller value of $L(P_i)$ and $C(P_i)$ (e.g., a darker and less saturated electronic image 120) results in a smaller arc as the position of the color 310 is positioned near the center of the LCh color space. The palette harmony module 112 computes the D for each harmonic template $T_m$ and global rotation angle ∝ value (e.g., the global rotation angle is bounded by values [0, 360]) to determine a combination of harmonic template and global rotation angle that generate the smallest value of $D_{LCh}$. The palette harmony module 112 performs a minimization function to search for the global rotation angle. For example, the palette harmony module 112 searches for the global rotation angle using a computation that is represented by a formula, such as:

$$\alpha_m^* = \operatorname*{argmin}_{\alpha} D(P, T_m(\alpha)). \qquad (2)$$

In Equation (2), $\alpha^*_m$ represents the global rotation angle that minimizes the hue distance D of the template $T_m$ from the color palette P.

Similarly, the palette harmony module 112 determines the harmonic template that minimizes the aggregate hue distance. For example, the palette harmony module 112 performs a computation that is represented by $$T_m^* = \operatorname*{argmin}_{T_m} D(P, T_m(\alpha_m^*)).$$

Figure 6:
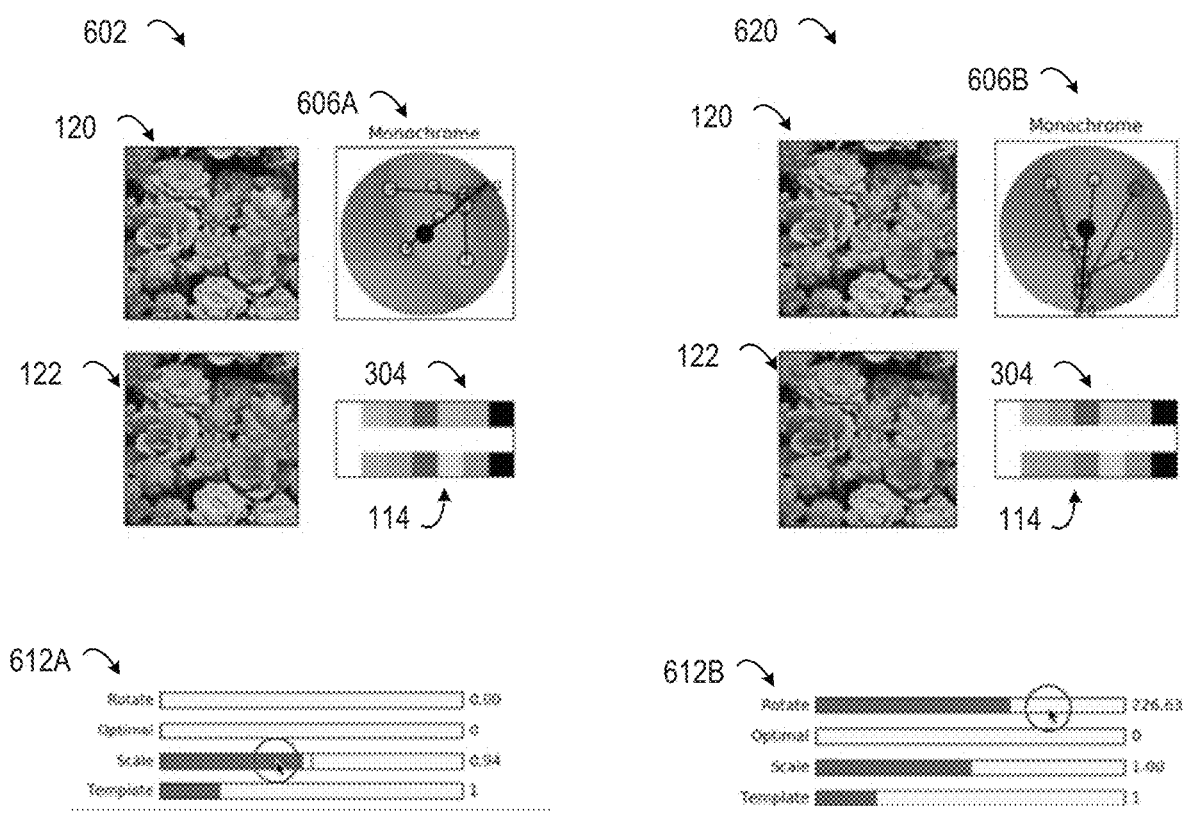
FIG. 6 depicts an example of a user interface that is updated by the electronic image processing application, according to certain embodiments of the present disclosure.

The palette harmony module 112 uses $T^*_m$ to represent the template that minimizes the aggregate hue distance and $D(P, T_m(\alpha^*_m))$ is a function of the distance between the color palette P and the template $T_m(\alpha^*_m)$ at the global rotation angle that minimizes the hue distance of the template $T_m$. FIG. 6 depicts an example of user interface 602 that is updated by the electronic image processing application 102, according to certain embodiments of the present disclosure. The electronic image processing application 102 generates a user interface 602 having multiple elements including electronic image 120, modified electronic image 122, color palette 304, modified color palette 114, user selectable edits 612A and 612B, and harmonized color wheels 606A and 606B.

For example, the electronic image processing application 102 displays the electronic image 120 in the user interface 602. The color palette module 110 generates a color palette 304 using processes described in relation to FIGS. 2 and 3. The electronic image processing application 102 displays the color palette 304 in the user interface 602. The palette harmony module 112 determines a harmonic template from the harmonic template database 113. In this case, the monochrome harmonic template is selected and applied and displayed on the color wheel 606A along with the color palette 304. The palette harmony module 112 adjusts positions of the colors of the color palette 304 in response to receiving inputs from the user selectable edits 612A.

In some embodiments, the user selectable edits 612A include the controls "rotate", "optimal", "scale", and "template." The user selectable edits 612A correspond to particular manipulations of the color palette 304 and the harmonic template applied. For instance, the "rotate" control adds an extra global rotation to the template after it has been applied to the original positions of the image colors. In response to the user selecting a rotate value between [0, 359], the palette harmony module 112 adjusts all axes of the harmonic template, and all of the colors of the color palette 304 to new positions rotated a corresponding number of degrees [0, 359] around the color wheel. The "optimal" control is selectable for values "0" or "1". In response to a user selection of the value "1" for the optimal control, the palette harmony module 112 automatically finds a fitting harmonic template with the minimal aggregate hue distance and selects the fitting harmonic template for application to the color palette 304. In response to a user adjusting the "scale" control, the palette harmony module 112 to move each color of the color palette 304 towards the axis of the template. A value of "0" for the scale control results in no adjustment of the colors, and in contrast a value of 0.94 shown in user selectable edits 612A results in the palette harmony module 112 moving the colors towards the axis of the harmonic template an amount equal to 94% of the distance between the color and the axis of the harmonic template. Modifying the "template" control enables the user to select the desired template to be applied by module 112. In response to adjustments to the user selectable edits 612A, the electronic image processing application updates the user interface 602 to display the modified color palette 114 and the modified electronic image 122 that corresponds to the transformation applied to the modified color palette 114.

In another example involving a different set of values for user selectable edits 612B, the electronic image processing application 102 generates an updated user interface 620. The updated user interface 620 includes the electronic image 120, the color palette 304, the modified harmonized color wheel 606B, the modified color palette 114, and the modified electronic image 122. In response to the different values of user selectable edits 612B, the palette harmony module 112 modifies the color palette 304. The user selectable edits 612B include a value "rotate" of 226.63, an "optimal" value of "0", a value of "scale" of "1.0", and a "template" value of "1." The palette harmony module 112 modifies the axis of the harmonic template as shown in color wheel 606B. Accordingly, the palette harmony module 112 adjusts each color of color palette 304 to generate modified color palette 114. In response to the optimal value, the palette harmony module 112 makes no modifications to the color palette 304. In response to the scale value, the palette harmony module 112 adjusts the colors of color palette 304 to a position along the axis of the monochrome harmonic template. In response to the template value, the palette harmony module selects the monochrome harmonic template, corresponding to the value "1."

Figure 7:
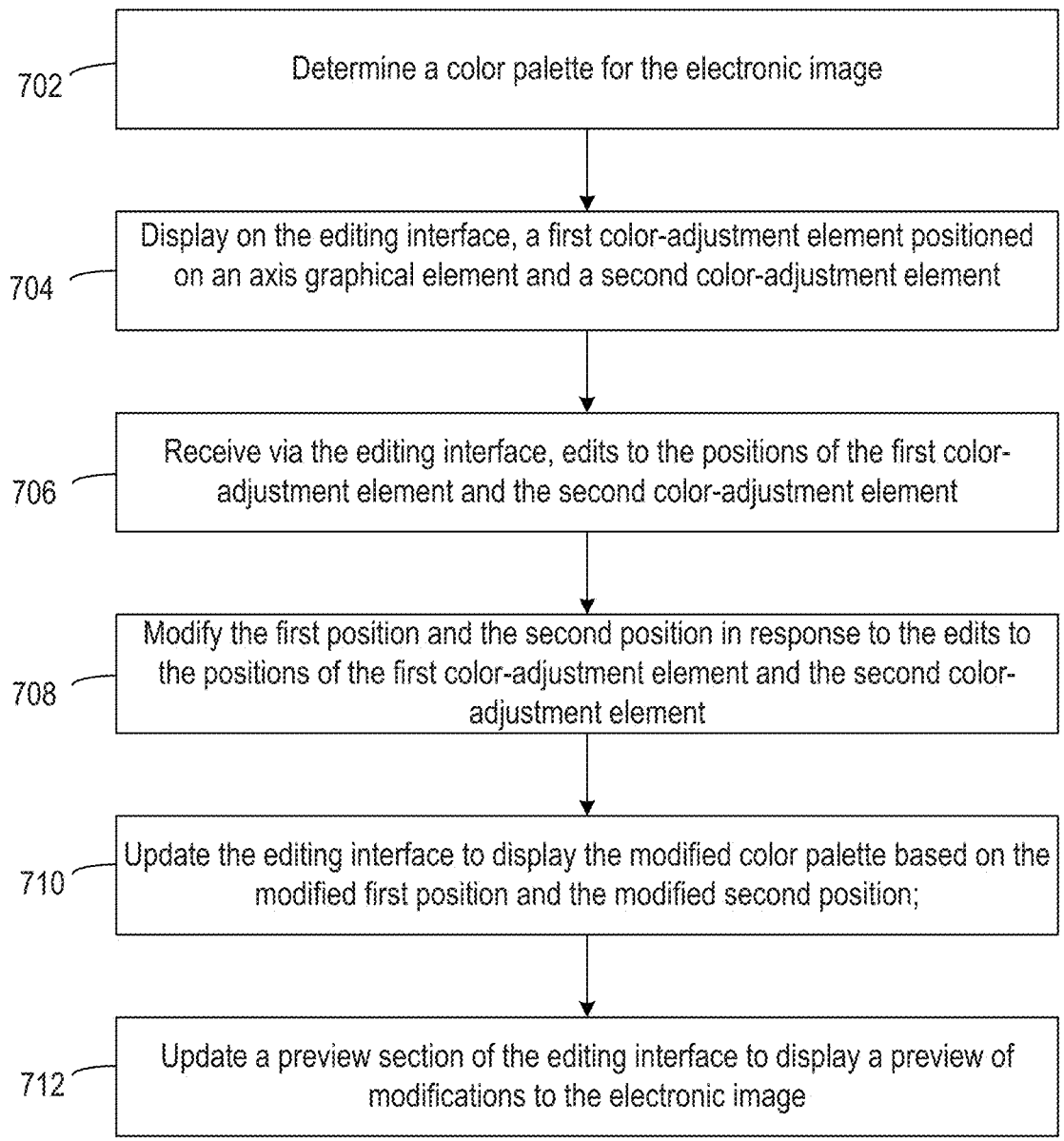
FIG. 7 depicts an example of a process for modifying an editing interface for manipulating an electronic image, according to certain embodiments of the present disclosure.

FIG. 7 depicts an example of a process 700 for modifying an editing interface for manipulating an electronic image, according to certain embodiments of the present disclosure. One or more computing devices or software applications (e.g., the electronic image processing application 102) implement operations depicted by FIG. 7 by executing suitable program code. For illustrative purposes, the process 700 is described with reference to certain examples depicted in the figure. Other implementations, however, are possible.

At block 702, the process 700 involves determining a color palette for the electronic image. For instance, the electronic image processing application 102 can implement block 702 by performing one or more operations described above with respect to the color palette module 110 of FIG. 1.

At block 704, the process 700 involves displaying, on the editing interface, a first color-adjustment element positioned on an axis graphical element and a second color-adjustment element. For instance, the electronic image processing application 102 can implement block 704 by performing one or more operations described above with respect to the palette harmony module 112 of FIG. 1 and with respect to FIG. 6.

At block 706, the process 700 involves receiving via the editing interface, edits to the positions of the first color-adjustment element and the second color-adjustment element. For instance, the electronic image processing application 102 can implement block 706 by performing one or more operations described above with respect to the input device 130 and user selectable edits 612A and 612B with regard to FIG. 1 and FIG. 6 respectively.

At block 708, the process 700 involves modifying the first position and the second position in response to the edits to the positions of the first color-adjustment element and the second color-adjustment element. For instance, the electronic image processing application 102 can implement block 708 by performing one or more operations described above with respect to the palette harmony module 112 of FIG. 1 and with regard to FIG. 6.

At block 710, the process 700 involves updating the editing interface to display the modified color palette based on the modified first position and the modified second position. For instance, the electronic image processing application 102 can implement block 710 by performing one or more operations described above with respect to the presentation device 140 of FIG. 1 and the updated user interface 620 of FIG. 6.

At block 712, the process 700 involves updating a preview section of the editing interface to display a preview of modifications to the electronic image. For instance, the electronic image processing application 102 can implement block 712 by performing one or more operations described above with respect to the palette harmony module 112 and the presentation device 140 of FIG. 1, and the updated user interface 620 of FIG. 6

Example of a Computing System for Implementing Certain Embodiments

Figure 8:
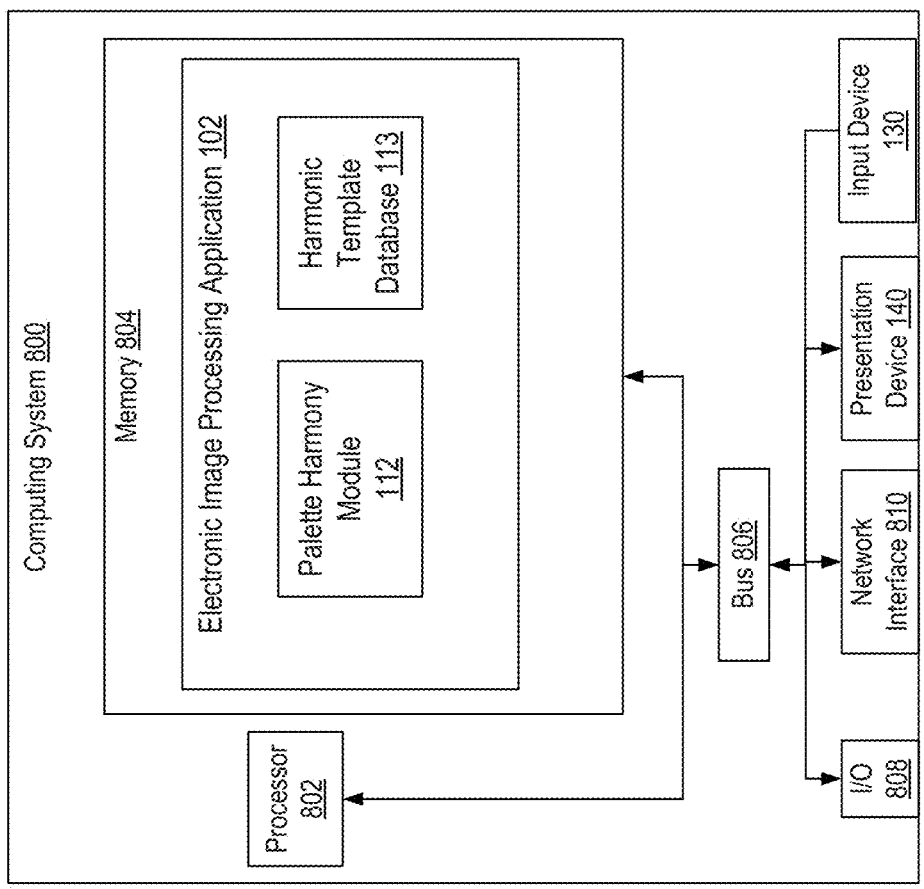
FIG. 8 depicts an example of a computing system for implementing certain embodiments of the present disclosure.

Any suitable computing system or group of computing systems can be used for performing the operations described herein. For example, FIG. 8 depicts an example of the computing system 800. The implementation of computing system 800 could be used for one or more of an electronic image processing application 102 and a palette harmony module 112. In other embodiments, a single computing system 800 having devices similar to those depicted in FIG. 8 (e.g., a processor, a memory, etc.) combines the one or more operations and data stores depicted as separate systems in FIG. 1.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

A memory device 804 includes any suitable non-transitory computer-readable medium for storing electronic image processing application 102, harmonic template database 113, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 800 may also include a number of external or internal devices, an input device 130, a presentation device 140, or other input or output devices. For example, the computing environment 100 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes electronic image processing application 102 that configures the processor 802 to perform one or more of the operations described herein. Examples of the electronic image processing application 102 include, in various embodiments, color palette module 110, palette harmony module 112, or other suitable applications that perform one or more operations described herein (e.g., one or more development applications for generation of the modified electronic image 122 or the harmonic template database 113). The program code may be resident in the memory device 804 or any suitable computer-readable medium and may be executed by the processor 802 or any other suitable processor.

In some embodiments, one or more memory devices 804 stores program data such as parameters and settings for the harmonic template database 113, modified color palette 114, or both. In additional or alternative embodiments, one or more of the programs, images, modules, and functions described herein are stored in different memory devices 804 accessible via a data network.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device executing an electronic image processing application 102) via a data network using the network interface device 810.

In some embodiments, the computing system 800 also includes the input device 130 and the presentation device 140 depicted in FIG. 8. An input device 130 can include any device or group of devices suitable for receiving visual, auditory, or other suitable input that controls or affects the operations of the processor 802. Non-limiting examples of the input device 130 include a touchscreen, a mouse, a keyboard, a microphone, a separate mobile computing device, etc. A presentation device 140 can include any device or group of devices suitable for providing visual, auditory, or other suitable sensory output. Non-limiting examples of the presentation device 140 include a touchscreen, a monitor, a speaker, a separate mobile computing device, etc.

Although FIG. 8 depicts the input device 130 and the presentation device 140 as being local to the computing device that executes the electronic image processing application 102, other implementations are possible. For instance, in some embodiments, one or more of the input device 130 and the presentation device 140 can include a remote client-computing device that communicates with the computing system 800 via the network interface device 810 using one or more data networks described herein.

Examples of Image Results Generated with Palette-Based Color Composition

Figure 9:
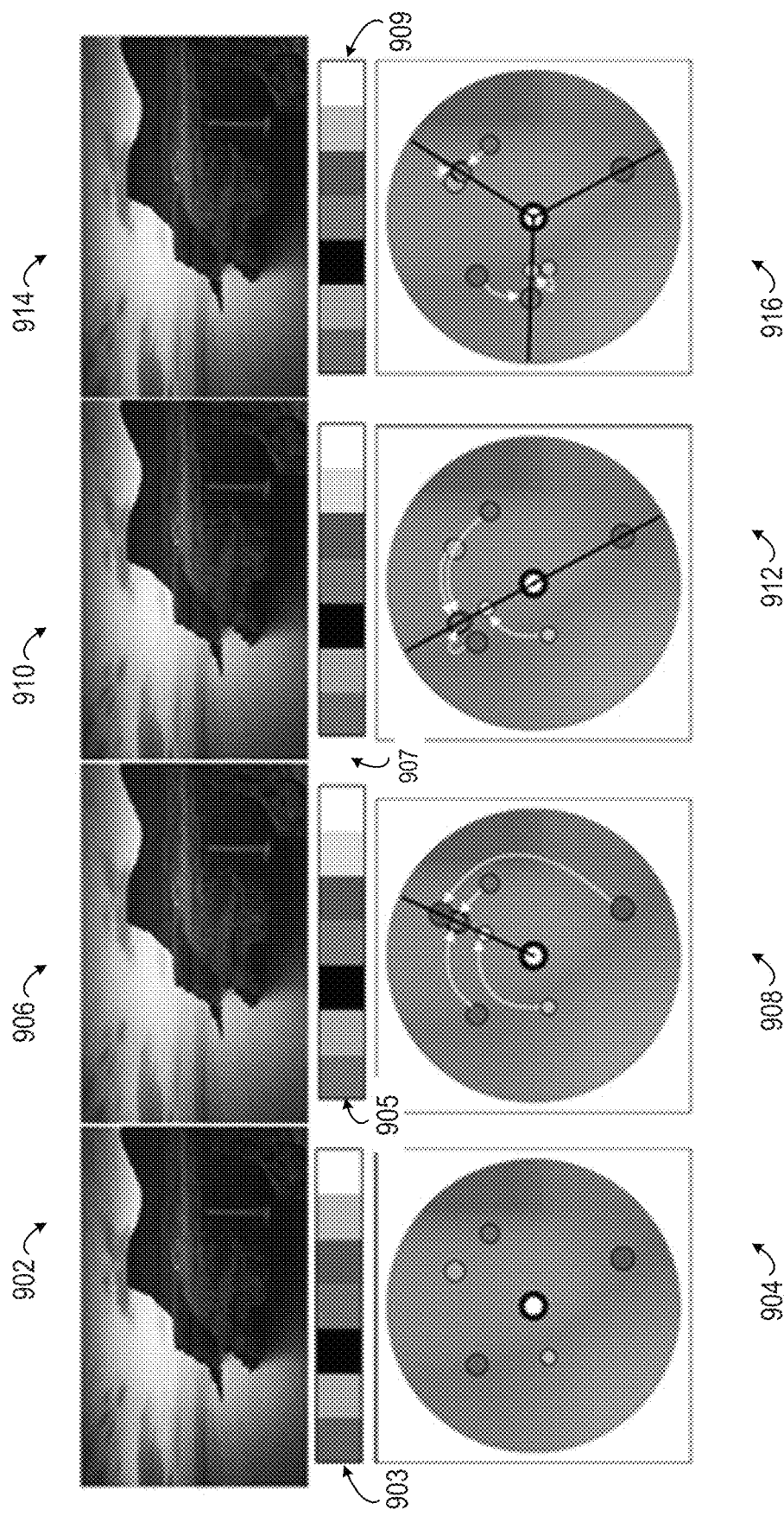
FIG. 9 depicts examples of image results generated by applying palette-based color composition to an input image using certain embodiments of the present disclosure.

FIG. 9 depicts examples of image results generated by applying palette-based color composition to an input image 902 using certain embodiments of the present disclosure. In FIG. 9, the input image 902 has a color palette 903 that can be represented on color wheel 904904. Applying palette-based color composition to the input image 902 generates a corresponding modified image 906 having a modified color palette 905 by using an applied monochrome harmonic template 908. In another example, applying palette-based color composition to the input image 902 generates a corresponding modified image 910 having a modified color palette 907 by using an applied complementary harmonic template 912. In yet another example, applying palette-based color composition to the input image 902 generates a corresponding modified image 914 having a modified color palette 909 by using an applied triad harmonic template 916.

Figure 10:
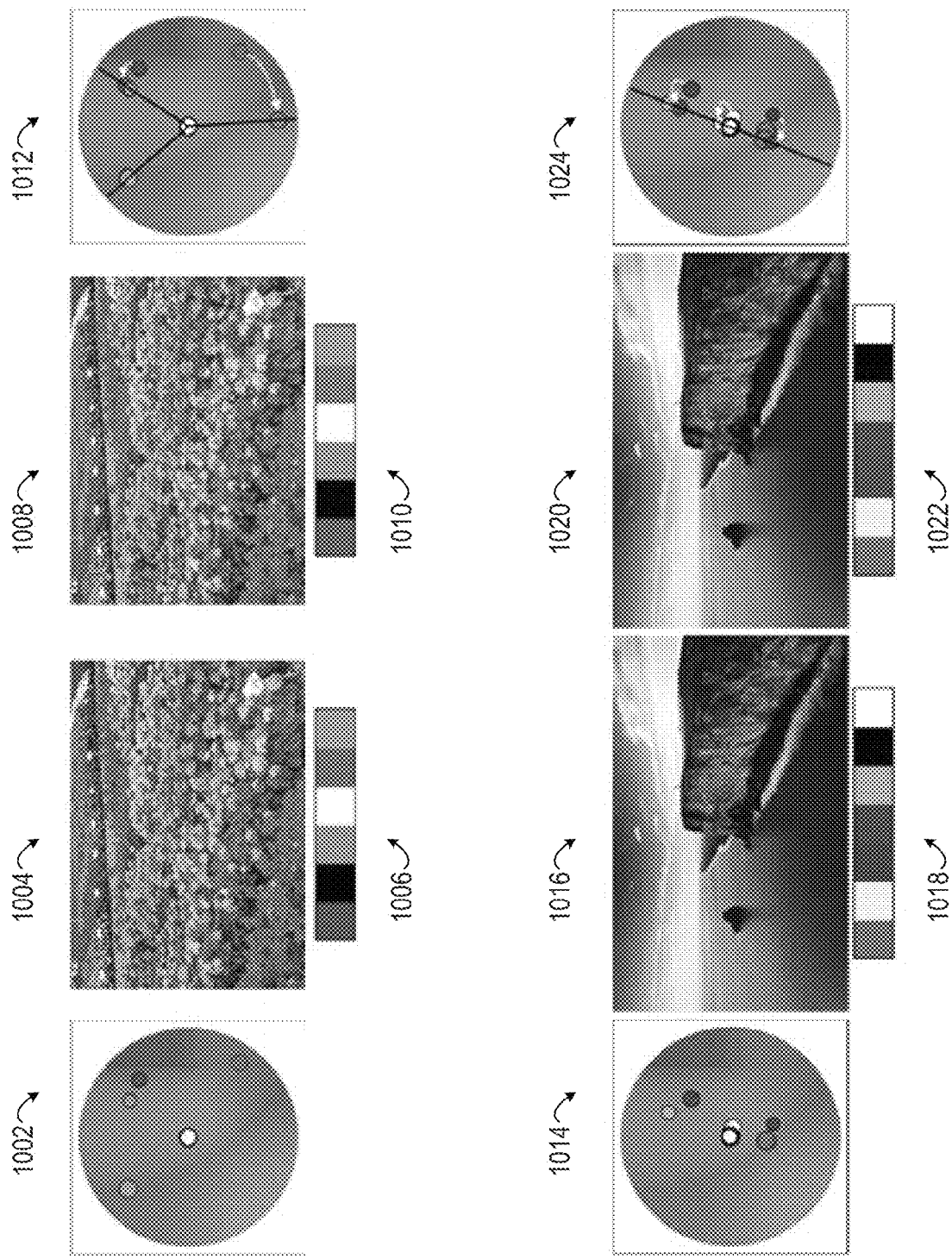
FIG. 10 depicts additional examples of image results generated by applying palette-based color composition to an input image using certain embodiments of the present disclosure.

FIG. 10 depicts additional examples of image results generated by applying palette-based color composition to an input image using certain embodiments of the present disclosure. In one example, an input image 1004 has a color wheel 1002 that represents a color palette 1006. The palette harmony module 112 can generate a harmonized image 1008 having a modified color palette 1010 by using an applied triad harmonic template 1012. In another example, an input image 1016 has a color wheel 1016 that represents a color palette 1018. The palette harmony module 112 can generate a harmonized image 1020 having a modified color palette 1022 by using an applied triad harmonic template 1024. In these examples, the palette harmony module 112 determined the optimal harmonic template for the color palettes and applied the harmonic template automatically.

Figure 11:
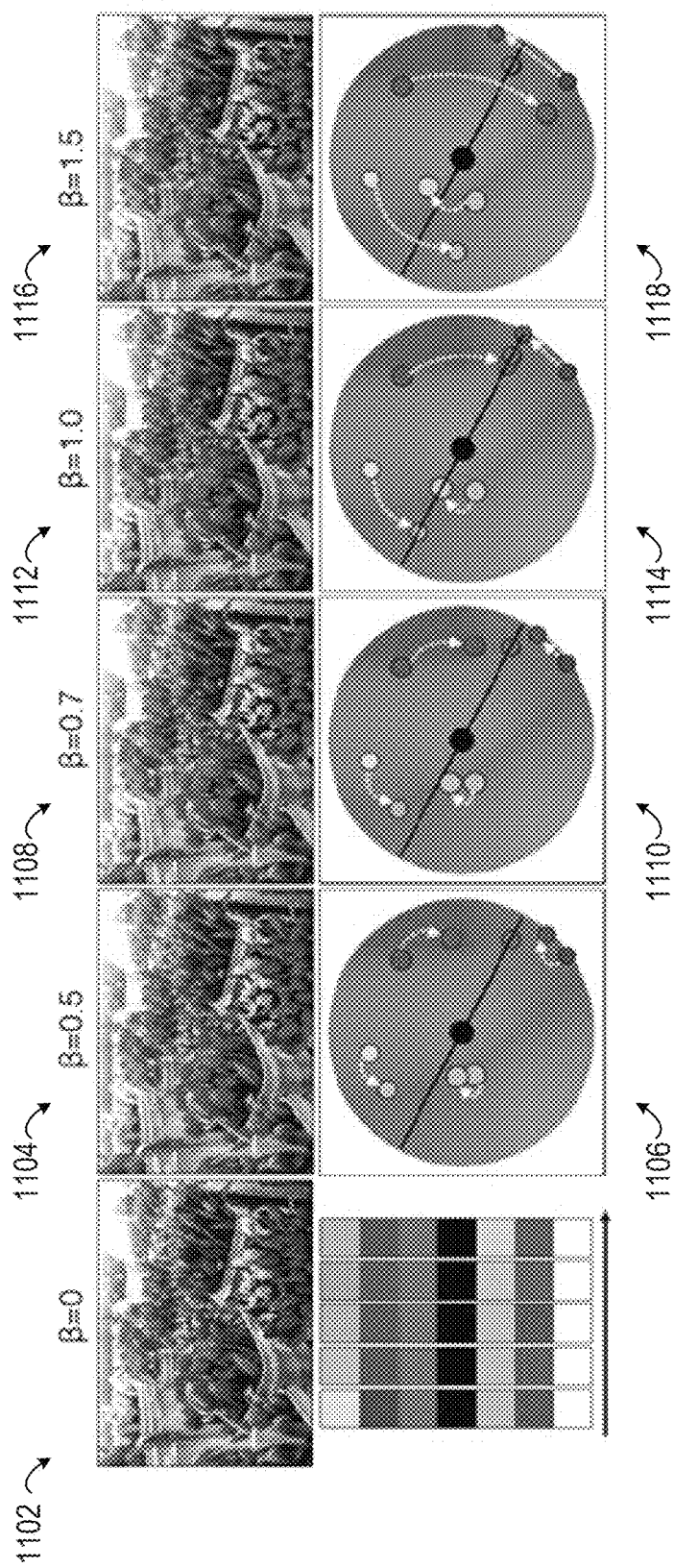
FIG. 11 depicts examples of image results generated by applying palette-based color composition with varying strength factor to an input image using certain embodiments of the present disclosure.

FIG. 11 depicts examples of image results generated by applying palette-based color composition with varying strength factor ("scale") to an input image using certain embodiments of the present disclosure. In this example, an input image 1102 having a strength factor of $\beta=0$ is transformed into various harmonized images 1104, 1108, 1112, and 1116 using respective applied harmonic templates 1106, 1110, 1114, 1118. The applied harmonic templates 1106, 1110, 1114, 1118 correspond, respectively, to values of $\beta=0.5$, $\beta=0.7$, $\beta=1.0$, and $\beta=1.5$.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method of palette-based color composition of an electronic image, wherein the method includes one or more processing devices performing operations comprising:
   determining a color palette for the electronic image, wherein the color palette comprises a first image color at a first position in a color space and a second image color at a second position in the color space;
   applying, to the color palette in the color space, a harmonic template using a combination of a global rotation angle and a secondary rotation angle, wherein the harmonic template, as applied, minimizes an aggregate of hue distances computed from the first image color at the first position and the second image color at the second position;
   modifying the color palette by moving at least one of (i) the first image color from the first position toward a position along a first axis of the harmonic template or (ii) the second image color from the second position toward a modified position along a second axis of the harmonic template;
   modifying a pixel color located at a third position in the color space, wherein the third position is between the first position and the position along the first axis, by moving the pixel color from the third position in a direction towards the first axis based on a ratio of (a) a first distance between the third position and the first position and (b) a second distance between the first position and the second position; and
   updating an editing interface to display the modified color palette.

2. The method of claim 1, wherein the global rotation angle of the harmonic template is an angle measured from a reference position to the first axis of the harmonic template as applied, and wherein the secondary rotation angle is measured from (i) the second axis of the harmonic template as applied to (ii) an adjusted position of the second axis that reduces the aggregate of hue distances.

3. The method of claim 1, wherein the first image color at the first position is associated with the first axis of the harmonic template, wherein the second image color at the second position is associated with the second axis of the harmonic template, wherein the operations further comprise:
   modifying the first position of the first image color based on receiving a modification of the first axis of the harmonic template; and
   modifying the second position of the second image color based on receiving a modification of the second axis of the harmonic template.

4. The method of claim 1, the operations further comprising:
   displaying, on the editing interface, a first color-adjustment element positioned on an axis graphical element and a second color-adjustment element, wherein:
   (i) the first color-adjustment element represents the first image color (ii) the second color-adjustment element represents the second image color, (iii) the axis graphical element represents one or more of the first axis and the second axis, and (iv) positions of the first color-adjustment element and the second color-adjustment element, respectively, represent the first image color at the first position in the color space and the second image color at the second position in the color space;
   receiving, via the editing interface, edits to the positions of the first color-adjustment element and the second color-adjustment element;
   modifying the first position and the second position in response to the edits to the positions of the first color-adjustment element and the second color-adjustment element;
   updating the editing interface to display the modified color palette based on the modified first position and the modified second position; and
   updating a preview section of the editing interface to display a preview of modifications to the electronic image, wherein updating the preview section comprises adjusting, in the electronic image as displayed in the preview section, a first hue in accordance with the modified first position and a second hue in accordance with the modified second position.

5. The method of claim 4 wherein one or more of the edits to the positions of the first color-adjustment element and the second color-adjustment element is selected from a group of editing inputs including the global rotation angle, a harmonic template strength factor, a manual harmonic template selection, or an automatic selection of a fitting harmonic template.

6. The method of claim 4 wherein updating a preview section of the editing interface to display a preview of modifications to the electronic image includes displaying transformations applied to the color palette in the updated preview section, wherein the transformations applied to the color palette include:
   the first image color at the first position;
   the second image color at the second position;
   the first image color at the modified first position;
   the second image color at the modified second position; and
   the harmonic template.

7. A method of modifying an editing interface for manipulating an electronic image, the method comprising:
   determining a color palette for the electronic image, wherein the color palette comprises a first image color at a first position in a color space and a second image color at a second position in the color space, wherein the first position is associated with an axis of a harmonic template;
   displaying, on the editing interface, a first color-adjustment element positioned on an axis graphical element and a second color-adjustment element, wherein:
      (i) the first color-adjustment element represents the first image color, (ii) the second color-adjustment element represents the second image color, (iii) the axis graphical element represents the axis, and (iv) positions of the first color-adjustment element and the second color-adjustment element, respectively, represent the first image color at the first position in the color space and the second image color at the second position in the color space;
   receiving, via the editing interface, edits to the positions of the first color-adjustment element and the second color-adjustment element;
   modifying the first position and the second position in response to the edits to the positions of the first color-adjustment element and the second color-adjustment element;
   updating the editing interface to display a modified color palette based on the modified first position and the modified second position;
   modifying a pixel color located at a third position in the color space, wherein the third position is between the first position and the position along the axis, by moving the pixel color from the third position in a direction towards the axis based on a ratio of (a) a first distance between the third position and the first position and (b) a second distance between the first position and the second position; and
   updating a preview section of the editing interface to display a preview of modifications to the electronic image, wherein updating the preview section comprises adjusting, in the electronic image as displayed in the preview section, a first hue in accordance with the modified first position and a second hue in accordance with the modified second position.

8. The method of claim 7 wherein updating the editing interface to display the modified color palette based on the modified first position and the modified second position includes displaying a transformation applied to the color palette, wherein the transformation applied to the color palette comprises:
   the first color-adjustment element representing the first image color at the first position;
   the second color-adjustment element at the modified first position;
   the second color-adjustment element representing the second image color at the second position;
   the second color-adjustment element at the modified second position; and
   the axis graphical element.

9. The method of claim 7 wherein edits to the positions of the first color-adjustment element and the second color-adjustment element comprise:
   a global rotation angle;
   a harmonic template strength factor;
   a manual harmonic template selection;
   or automatic selection of a fitting template.

10. The method of claim 9, wherein:
   the harmonic template strength factor represents an edit that moves the first position a percentage of an angular distance between a first axis of the axis graphical element and the first color-adjustment element; and
   the global rotation angle represents an edit that moves an entirety of the harmonic template a number of degrees.

11. The method of claim 7, wherein the modifying the first position and the second position in response to the edits to the positions of the first color-adjustment element and the second color-adjustment element comprises:
   associating the first color-adjustment element with a first axis of the axis graphical element based on an angular distance between the first color-adjustment element and the first axis of the axis graphical element; and
   modifying the second position based on receiving a modification to the first color-adjustment element, wherein the modification to the second position is proportional to a change in the angular distance between the first color-adjustment element and the first axis of the axis graphical element.

12. The method of claim 11, wherein the modifying the first position and the second position in response to the edits to the positions of the first color-adjustment element and the second color-adjustment element further comprises:
   modifying the second position based on receiving a modification to the first axis of the axis graphical element, wherein the modification to the second position is proportional to the change in the angular distance between the first axis of the axis graphical element and the first color-adjustment element.

13. The method of claim 7, wherein the modifying the first position and the second position in response to the edits to the positions of the first color-adjustment element and the second color-adjustment element comprises:
   associating the second color-adjustment element with a second axis of the axis graphical element based on an angular distance between the second color-adjustment element and the second axis of the axis graphical element; and
   modifying the first position based on receiving a modification to the second color-adjustment element, wherein the modification to the first position is proportional to a change in the angular distance between the second color-adjustment element and the second axis of the axis graphical element.

14. The method of claim 13 wherein the modifying the first position and the second position in response to the edits to the positions of the first color-adjustment element and the second color-adjustment element further comprises:
modifying the first position based on receiving a modification to the second axis of the axis graphical element, wherein the modification to the first position is proportional to the change in the angular distance between the second axis of the axis graphical element and the second color-adjustment element.

15. A system comprising:
one or more processing devices; and
a non-transitory computer-readable medium communicatively coupled to the one or more processing devices and storing instructions, wherein the one or more processing devices are configured to execute the instructions and thereby perform operations comprising:
determining a color palette for an electronic image, wherein the color palette comprises a first image color at a first position in a color space and a second image color at a second position in the color space;
applying, to the color palette in the color space, a harmonic template using a combination of a global rotation angle and a secondary rotation angle, wherein the harmonic template, as applied, minimizes an aggregate of hue distances computed from the first image color at the first position and the second image color at the second position;
modifying the color palette by moving at least one of (i) the first image color from the first position toward a position along a first axis of the harmonic template or (ii) the second image color from the second position toward a modified position along a second axis of the harmonic template;
modifying a pixel color located at a third position in the color space, wherein the third position is between the first position and the position along the first axis, by moving the pixel color from the third position in a direction towards the first axis based on a ratio of (a) a first distance between the third position and the first position and (b) a second distance between the first position and the second position; and
updating an editing interface to display the modified color palette.

16. The system of claim 15, wherein the global rotation angle of the harmonic template is an angle measured from a reference position to the first axis of the harmonic template as applied, and wherein the secondary rotation angle is measured from (i) the second axis of the harmonic template as applied to (ii) an adjusted position of the second axis that reduces the aggregate of hue distances.

17. The system of claim 15, wherein the first image color at the first position is associated with the first axis of the harmonic template, wherein the second image color at the second position is associated with the second axis of the harmonic template, wherein the operations further comprise:

modifying the first position of the first image color based on receiving a modification of the first axis of the harmonic template; and
modifying the second position of the second image color based on receiving a modification of the second axis of the harmonic template.

18. The system of claim 15, the operations further comprising:
displaying, on the editing interface, a first color-adjustment element positioned on an axis graphical element and a second color-adjustment element, wherein:
(i) the first color-adjustment element represents the first image color, (ii) the second color-adjustment element represents the second image color, (iii) the axis graphical element represents one or more of the first axis and the second axis, and (iv) positions of the first color-adjustment element and the second color-adjustment element, respectively, represent the first image color at the first position in the color space and the second image color at the second position in the color space;
receiving, via the editing interface, edits to the positions of the first color-adjustment element and the second color-adjustment element;
modifying the first position and the second position in response to the edits to the positions of the first color-adjustment element and the second color-adjustment element;
updating the editing interface to display the modified color palette based on a modified first position and a modified second position; and
updating a preview section of the editing interface to display a preview of modifications to the electronic image, wherein updating the preview section comprises adjusting, in the electronic image as displayed in the preview section, a first hue in accordance with the modified first position and a second hue in accordance with the modified second position.

19. The system of claim 18 wherein one or more of the edits to the positions of the first color-adjustment element and the second color-adjustment element is selected from a group of editing inputs including the global rotation angle, a harmonic template strength factor, a manual harmonic template selection, or an automatic selection of a fitting harmonic template.

20. The system of claim 18 wherein updating a preview section of the editing interface to display a preview of modifications to the electronic image includes displaying transformations applied to the color palette in the updated preview section, wherein the transformations applied to the color palette include:
the first image color at the first position;
the second image color at the second position;
the first image color at the modified first position;
the second image color at the modified second position; and
the harmonic template.

* * * * *